Patented June 19, 1951

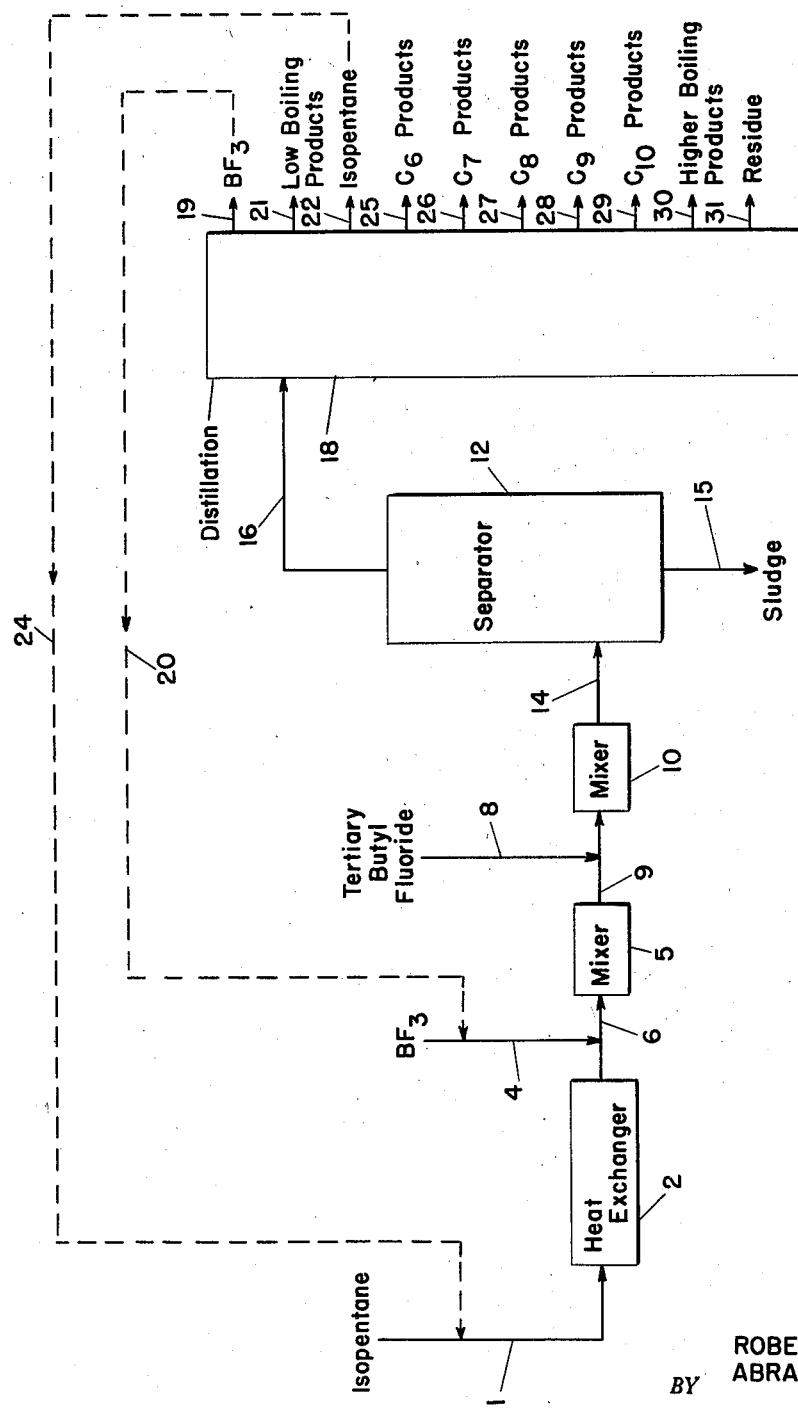

2,557,117

UNITED STATES PATENT OFFICE 2,557,117

SELF-ALKYLATION OF ISOPENTANE

Robert M. Kennedy, Newtown Square, and Abraham Schneider, Philadelphia, Pa., assignors to Sun Oil Company, Philadelphia, Pa., a corporation of New Jersey Application September 9, 1949, Serial No. 114,795

10 Claims. (Cl. 260—683.4)

This invention relates to the preparation of hydrocarbons especially suitable for use in safety fuels, and more particularly to the preparation of isopentane dimer by the self-alkylation of isopentane under novel catalytic conditions.

Isopentane is of value in the preparation of fuel compositions for use in high compression spark type internal combustion engines, such as aviation engines. However, its use therein is limited because of its high volatility, and further because of the fire hazard involved when substantial quantities of isopentane are present in a fuel composition. The present process provides a process for converting isopentane to a dimer thereof, and to other hydrocarbons, which dimer and other hydrocarbons are valuable as components of safety fuels because of their high antiknock characteristics and high flash points.

The alkylation of hydrocarbons, such as isopentane, by olefins under the catalytic influence of sulfuric acid or anhydrous hydrofluoric acid, usually at temperatures of from —10° C. to 30° C., has been described. However, these and other catalysts which have been proposed heretofore for carrying out such an alkylation are insoluble in the hydrocarbons, or at most are soluble only to a limited extent. In such processes, therefore, it has been necessary to effect intimate contact between the hydrocarbon phase and the catalyst phase, which usually requires provision of a mechanically agitated reactor for continuously and vigorously agitating the reaction mixture during the reaction period. This adds considerably to the expense of the operation with respect to both installation and operating costs.

It has now been found that by employing novel catalytic conditions, as hereinafter fully described, isopentane dimer can be prepared in good yield by the self-alkylation of isopentane, i. e. by the alkylation of isopentane by itself, the reaction being effected in homogeneous phase, and that other hydrocarbons valuable as safety fuel components are formed by side reactions in the process. The constituents of the catalyst are an alkyl fluoride and $BF_3$, both of which materials are soluble in isopentane, at least in the concentrations employed, so that the reaction does not depend upon contact between two separate phases. By "isopentane dimer" is meant a 10 carbon isoparaffin, or a mixture of such isoparaffins, obtained by reaction of isopentane with itself. 3,3,6-trimethylheptane is the isopentane dimer produced in major quantity in the present process, though small amounts of other dimers, such as 3,3,4,5-tetramethylhexane and 3,3,5-trimethylheptane may be obtained.

The process of the present invention comprises bringing together an alkyl fluoride and $BF_3$ in the presence of isopentane, at a suitable temperature, as hereinafter fully set forth, whereby a catalytic condition becomes established which causes the immediate self-alkylation of isopentane. In bringing together the alkyl fluoride and $BF_3$, the alkyl fluoride can be introduced into the isopentane to which $BF_3$ has already been added, or the $BF_3$ can be introduced into a solution of the alkyl fluoride in the isopentane, or both of the catalytic components can be introduced simultaneously but separately into the isopentane. It is also permissible first to dissolve each of the catalytic components in separate portions of isopentane, and then bring together the separate portions to effect reaction. It is not permissible, however, to premix the alkyl fluoride and $BF_3$ and then add the mixture to the isopentane, for in such case the catalytic conditions will be immediately spent when the alkyl fluoride and $BF_3$ are brought into contact with each other. The components of the catalyst and the isopentane form a homogeneous phase, irrespective of their mode of addition, so that reaction does not depend upon contact between separate phases, and hence the mechanical agitation required to provide contact between separate phases is unnecessary.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote the self-alkylation of isopentane to form 3,3,6-trimethylheptane.

The temperature at which such reaction will be obtained varies, however, with the particular alkyl fluoride employed. We have found that when the fluoride is a tertiary fluoride, the reaction begins to occur to a substantial extent at temperatures as low as —120° C. When the alkyl fluoride is a secondary fluoride, the reaction takes place to a substantial extent at temperatures as low as —90° C. At temperatures below this value, a secondary fluoride in combination with $BF_3$ has little catalytic effect. When the alkyl fluoride is a primary fluoride, the reaction temperature should be above —10° C. in order to obtain substantial catalytic action. Ethyl fluoride, however, has been found to be more inert than the primary fluorides having three or more carbon atoms per molecule and requires a temperature of at least about +20° C. in order to give rise to substantial catalytic action. Methyl fluoride in combination with $BF_3$ does not give any substantial catalytic effect at least at temperatures below +150° C., and is not considered within the scope of the present invention.

The reaction may, if desired, be carried out at much higher temperatures than the minimum values above specified, and no definite maximum temperature can be given for all cases. In practice the maximum temperature which may be employed usually will depend upon the pressure under which the available equipment is adapted to operate or upon the desired degree of purity of the isopentane dimer. As a general rule, it will be desirable to operate at all times at temperatures below $+150°$ C. and usually well below this value, preferably below 25° C. A relatively low reaction temperature tends to suppress disproportionation and cleavage of the isopentane dimer, with a resulting high proportion thereof (mainly 3,3,6-trimethylheptane) in the reaction mixture. It is noteworthy, however, that the use of the present type of catalytic agents permits the self-alkylation of isopentane to be conducted over a much wider range of temperatures than are employed in the known alkylation processes using other catalysts.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes, and the like. As specific illustrations of secondary fluorides, the following may be mentioned: isopropyl fluoride; 2-fluoro-butane; 2-fluoro-3-methylbutane; and 2-fluoro-3,3-dimethylbutane. A few specific examples of tertiary fluorides are: t-butyl fluoride; t-amyl fluoride; 2-fluoro-2,3-dimethylbutane and other t-hexyl fluorides; t-heptyl fluorides; and 4-fluoro-2,2-4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the minimum values as set forth above.

In the present process, it is characteristic that there will be formed, in addition to the isopentane dimer, that hydrocarbon which is equivalent to the alkyl fluoride employed. For example, if isopropyl fluoride or normal propyl fluoride is used, propane will be obtained in the product; if tertiary butyl fluoride is used, isobutane will be present in the product. Where the alkyl fluoride employed contains a tertiary carbon atom, the hydrocarbon formed therefrom is capable of entering into the reaction, and consequently may be partly converted into one or more other isoparaffins. Where the alkyl fluoride does not contain a tertiary carbon atom, such further reaction of the hydrocarbon formed from the alkyl fluoride does not occur. Tertiary amyl fluoride, which is converted to isopentane in the reaction, is a preferred catalytic component, since the so-formed isopentane will enter into the reaction and enhance the yield and purity of the isopentane dimer product.

It is preferred to employ an excess of isopentane in the reaction since excessive amounts of alkyl fluoride tends to promote reactions, such as isomerization, disproportionation and cleavage, of the reaction product. The preferred molar ratio of alkyl fluoride to isopentane is from 1:2 to 1:10. The amount of $BF_3$ reacted to initiate the reaction is small and is not considered critical. From about 1 to 10 grams per 100 grams of isopentane is suitable and gives good results, but more or less may be employed.

The self-alkylation reaction may be favored to a large extent, and other reactions suppressed, by using a low reaction temperature. The preferred temperature to employ is from $-80°$ C. to 25° C., although other temperature may be employed as herein described.

Referring now to the flow-sheet, isopentane enters the system through line 1 and flows through heat exchanger 2, which may be either a cooler or a heater, depending upon the temperature at which it is desired to conduct the reaction. On leaving heat exchanger 2, the isopentane is mixed first with one catalytic component and then with the other, or both may be introduced simultaneously but separately into the isopentane. For purpose of illustration, $BF_3$ is added to the isopentane first, through line 4, the isopentane containing $BF_3$ then passing into mixer 5 through line 6. It is apparent that if there is sufficient turbulence in line 6, mixer 5 may be omitted. The amount of $BF_3$ to employ is not critical, and a very small amount is sufficient, upon subsequent addition of alkyl fluoride, to establish the necessary catalytic condition.

After the addition of $BF_3$, the alkyl fluoride, tertiary butyl fluoride being used as illustrative, is introduced through line 8 into the $BF_3$-isopentane mixture flowing through line 9. The amount of alkyl fluoride to add will vary depending upon the other operating conditions, but generally will be within the range of 1 mole of alkyl fluoride to from 1 to 10 moles of isopentane.

A catalytic condition becomes established immediately upon mixing the tertiary butyl fluoride and $BF_3$, and self-alkylation of the isopentane occurs immediately. The mixture passes through mixer 10 (which may be omitted if turbulence in the flow line is sufficient), and the self-alkylation proceeds rapidly under the catalytic influence of the $BF_3$-alkyl fluoride combination.

Upon completion of the reaction, the mixture becomes heterogeneous due to separation of a sludge from the hydrocarbon phase. A stream of the reaction mixture is continuously withdrawn from mixer 10 through line 14 and is introduced into separator 12 wherein the two phases separate. The sludge settles to the bottom of the separator and is withdrawn through line 15. This material contains fluorine derived from the alkyl fluoride together with $BF_3$ in some sort of complex form. If desired, means (not shown) may be provided for removing $BF_3$ from the sludge and re-using the same.

The hydrocarbon phase is withdrawn from separator 12 through line 16 and is sent to distillation zone 18 for separation of the components. Distillation zone 18 will usually comprise a plurality of separate distillation steps suitable for making the separations indicated. The lowest boiling component will be any $BF_3$ which has remained dissolved in the hydrocarbon layer. As indicated, this $BF_3$ may be withdrawn through line 19 and recycled through line 20.

As shown by the drawing, the low boiling hydrocarbon constituents may be removed through line 21. Where an alkyl fluoride, such as propyl or isopropyl fluoride is employed as a catalytic component, some propane will be included in the low boiling constituents. Isopentane is removed through line 22 and recycled through the process through line 24. Intermediate products, those containing 6 through 9 carbon atoms, are removed through lines 25, 26, 27 and 28, respectively. Isopentane dimer is removed through line 29 and consists largely of 3,3,6-trimethylheptane. The small amount of higher boiling products formed is removed through line 30 and residue, if any, through line 31.

The following examples illustrate preferred embodiments of the present invention, which is not to be considered as limited thereby:

Example 1

A solution of about 23 g. tertiary butyl fluoride in 48 g. isopentane was introduced into a solution of 7 g. $BF_3$ in 88 g. isopentane at about $-80°$ C. The solution was added over a period of about 15 minutes. Upon completion of the addition, a lower layer was separated from the organic phase, and the organic phase allowed to warm to room temperature. Materials boiling below 3° C. were removed from the resulting hydrocarbon layer by distillation, yielding 34.5 g. of higher boiling product. Upon distillation, this product was found to contain about 35% of isopentane dimer boiling in the range 146–149° C., which was principally 3,3,6 - trimethylheptane. The relatively low temperature employed promoted self-alkylation of the isopentane so that a substantial quantity of isopentane dimer, which is valuable as a safety fuel component, was produced.

Example 2

A solution of 7 g. of $BF_3$ in 94.5 g. isopentane was charged to a reactor, and then a solution of 22 g. isopropyl fluoride in 40 g. isopentane was introduced into the reactor over a period of 10 minutes. The hydrocarbon product was separated from a lower layer and distilled. The following products were obtained:

| | |
|---|---|
| Lower layer, g | 13 |
| Propane, g | 7 |
| Isobutane, g | 28 |
| Isopentane recovered, g | 30.5 |
| $C_6+$ product, g | 65 |

Analysis of $C_6+$ product, vol. per cent:

| | |
|---|---|
| $C_6$ | 34 |
| $C_7$ | 17 |
| $C_8$ | 9 |
| $C_9$ | 11 |
| $C_{10}$ and heavier | 29 |

The $C_{10}$ and heavier fraction was composed largely of isopentane dimer. Frequently it is unnecessary to separate the fractions above $C_5$, except possibly to separate any high boiling materials, say those which boil above about 200° C., since all of the hydrocarbons formed may advantageously be employed in safety fuel compositions. The propane obtained was apparently derived from the isopropyl fluoride.

The present application is a continuation-in-part of patent application Serial No. 38,167, filed July 10, 1948.

We claim:

1. Method of preparing isopentane dimer by the instantaneous self-alkylation of isopentane in homogeneous phase which comprises reacting isopentane with itself in the presence of a catalyst comprising an admixture of $BF_3$ and an alkyl fluoride having at least two carbon atoms per molecule at a temperature sufficient to effect said instantaneous homogeneous phase reaction, said temperature being in the range of from $-120°$ C. to 150° C.

2. Method according to claim 1 wherein a $C_{10}$ fraction containing a substantial proportion of 3,3,6-trimethylheptane is separated from the reaction mixture.

3. Method of preparing isopentane dimer by the instantaneous self-alkylation of isopentane in homogeneous phase which comprises introducing an alkyl fluoride having at least two carbon atoms per molecule into isopentane containing dissolved $BF_3$ at a temperature sufficient to effect said instantaneous homogeneous phase reaction, said temperature being in the range of from $-120°$ C. to 150° C.

4. Method of preparing isopentane dimer by the instantaneous self-alkylation of isopentane in homogeneous phase which comprises introducing $BF_3$ into isopentane containing a dissolved alkyl fluoride having at least two carbon atoms per molecule at a temperature sufficient to effect said instantaneous homogeneous phase reaction, said temperature being in the range of from $-120°$ C. to 150° C.

5. Method of preparing isopentane dimer by the instantaneous self-alkylation of isopentane in homogeneous phase which comprises reacting isopentane with itself in the presence of a catalyst comprising an admixture of $BF_3$ and a tertiary alkyl fluoride at a temperature sufficient to effect said instantaneous homogeneous phase reaction, said temperature being in the range of from $-120°$ C. to 150° C.

6. Method according to claim 5 wherein the alkyl fluoride is tertiary butyl fluoride.

7. Method according to claim 5 wherein the alkyl fluoride is tertiary amyl fluoride.

8. Method of preparing isopentane dimer by the instantaneous self-alkylation of isopentane in homogeneous phase which comprises reacting isopentane with itself in the presence of a catalyst comprising an admixture of $BF_3$ and a secondary alkyl fluoride at a temperature sufficient to effect said instantaneous homogeneous phase reaction, said temperature being in the range of from $-90°$ C. to 150° C.

9. Method according to claim 8 wherein the alkyl fluoride is isopropyl fluoride.

10. Method of preparing isopentane dimer by the instantaneous self-alkylation of isopentane in homogeneous phase which comprises reacting isopentane with itself in the presence of a catalyst comprising an admixture of $BF_3$ and a primary alkyl fluoride having at least three carbon atoms per molecule at a temperature sufficient to effect said instantaneous homogeneous phase reaction, said temperature being in the range of from $-10°$ C. to 150° C.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,307,799 | Linn | Jan. 12, 1943 |
| 2,413,384 | Schmerling | Dec. 31, 1946 |